(12) United States Patent
Komoda

(10) Patent No.: US 6,509,673 B2
(45) Date of Patent: Jan. 21, 2003

(54) ULTRASONIC MOTOR CAPABLE OF SENSING A ROTATIONAL POSITION OF ITS ROTOR

(75) Inventor: Masahiko Komoda, Toyokawa (JP)

(73) Assignee: Asmo Co., Ltd., Shizuoka (JP)

(*) Notice: Subject to any disclaimer, the term of this patent is extended or adjusted under 35 U.S.C. 154(b) by 0 days.

(21) Appl. No.: 09/901,607

(22) Filed: Jul. 11, 2001

(65) Prior Publication Data

US 2002/0008442 A1 Jan. 24, 2002

(30) Foreign Application Priority Data

Jul. 21, 2000 (JP) .................................. 2000-220214
Dec. 27, 2000 (JP) .................................. 2000-397310

(51) Int. Cl.$^7$ ............................................. H01L 41/08
(52) U.S. Cl. ............................ 310/323.12; 310/316.01; 310/323.02
(58) Field of Search .................. 310/316.01, 316.02, 310/323.02, 323.03, 323.12, 323.16

(56) References Cited

U.S. PATENT DOCUMENTS 5,164,629 A * 11/1992 Nakanishi .............. 310/323.12
5,739,621 A * 4/1998 Atsuta et al. ........ 310/316.01 X
5,939,847 A * 8/1999 Ashizawa et al. ..... 310/316.02
6,037,701 A * 3/2000 Atsuta .................... 310/316.01
6,084,335 A * 7/2000 Tamai .................... 310/316.02
6,300,705 B1 * 10/2001 Komoda et al. ....... 310/323.12

FOREIGN PATENT DOCUMENTS

| JP | A-10-285964 | 10/1998 |
| JP | A-11-46485 | 2/1999 |
| JP | A-2000-69770 | 3/2000 |
| JP | A-2000-350480 | 12/2000 |

* cited by examiner

*Primary Examiner*—Mark O. Budd
(74) *Attorney, Agent, or Firm*—Law Offices of David G. Posz

(57) ABSTRACT

An ultrasonic motor includes a stator and a rotor. A plurality of slits are arranged at substantially equal angular intervals along an outer peripheral surface of the rotor. A photosensor is supported inside of an upper housing of the motor. The photosensor is arranged to oppose each one of the slits in a radial direction of the rotor when the slit comes in front of the photosensor during rotation of the rotor. Based on a signal outputted from the photosensor, a control device applies a high frequency alternating voltage between first and second electrode plates of the stator.

12 Claims, 5 Drawing Sheets

ULTRASONIC MOTOR CAPABLE OF SENSING A ROTATIONAL POSITION OF ITS ROTOR

CROSS REFERENCE TO RELATED APPLICATION

This application is based on and incorporates herein by reference Japanese Patent Application No. 2000-220214 filed on Jul. 21, 2000 and Japanese Patent Application No. 2000-397310 filed on Dec. 27, 2000.

BACKGROUND OF THE INVENTION

1. Field of the Invention

The present invention relates to an ultrasonic motor, and more specifically to an ultrasonic motor capable of sensing a rotational position of its rotor.

2. Description of Related Art

In some previously proposed motors, such as DC motors, ultrasonic motors or the like, a sensor and a sensor target are required as a part of a sensing arrangement for determining a rotational position of a rotor.

One example of such a previously proposed ultrasonic motor is shown in FIG. 8. In the ultrasonic motor 31, a plurality of magnets 34 acting as the sensor target are secured along a circumferential surface of a shaft 33 of a rotor 32 at substantially equal angular intervals. A Hall element 37 acting as the sensor is mounted inside of a housing 35 through a support member 36. The Hall element 37 is arranged to oppose each one of the magnets 34 in a radial direction of the rotor 32 when the magnet 34 comes in front of the Hall element 37 during rotation of the rotor 32. The Hall element 37 is connected to an encoder (not shown).

When the shaft 33 is rotated together with the rotor 32, a position of each one of the magnets 34 that comes in front of the Hall element 37 is sensed through the Hall element 37. Based on this, an amount of rotation of the rotor 32 relative to a reference position of the rotor 32 is determined to obtain a current rotational position of the rotor 32. A voltage to be applied to the ultrasonic motor 31 is controlled based on the current rotational position of the rotor 32, and thereby a rotational speed and the rotational position of the rotor 32 are controlled accordingly.

However, in this case, the dedicated sensor target needs to be provided to determine the rotational position of the rotor which is required in the rotational position control of the rotor. This causes an increase in the number of the components, resulting in an increase in a manufacturing cost of the ultrasonic motor. Furthermore, in order to detect a rotational direction of the rotor or to improve accuracy (resolution) in the position detection of the rotor, more than one sensor is required, disadvantageously causing a further increase in the number of the components.

SUMMARY OF THE INVENTION

The present invention addresses the above-described disadvantages. Thus, it is an objective of the present invention to provide an ultrasonic motor capable of detecting a rotational position of its rotor without requiring a dedicated sensor target.

It is another objective of the present invention to provide an ultrasonic motor capable of detecting a rotational direction of its rotor and also capable of providing improved accuracy in detection of a rotational position of the rotor without requiring a dedicated sensor target.

To achieve the objective of the present invention, there is provided an ultrasonic motor comprising a stator, a rotor and one or more sensors. The stator has a plurality of piezoelectric elements clamped between a plurality of blocks. The stator vibrates upon application of a voltage to the piezoelectric elements. The rotor is rotatably urged against the stator. The rotor has one or more slits formed in a peripheral surface of the rotor and is rotated by the vibrations of the stator. The one or more sensors are provided for sensing a position of at least one of the one or more slits.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

First Embodiment

Figure 1:
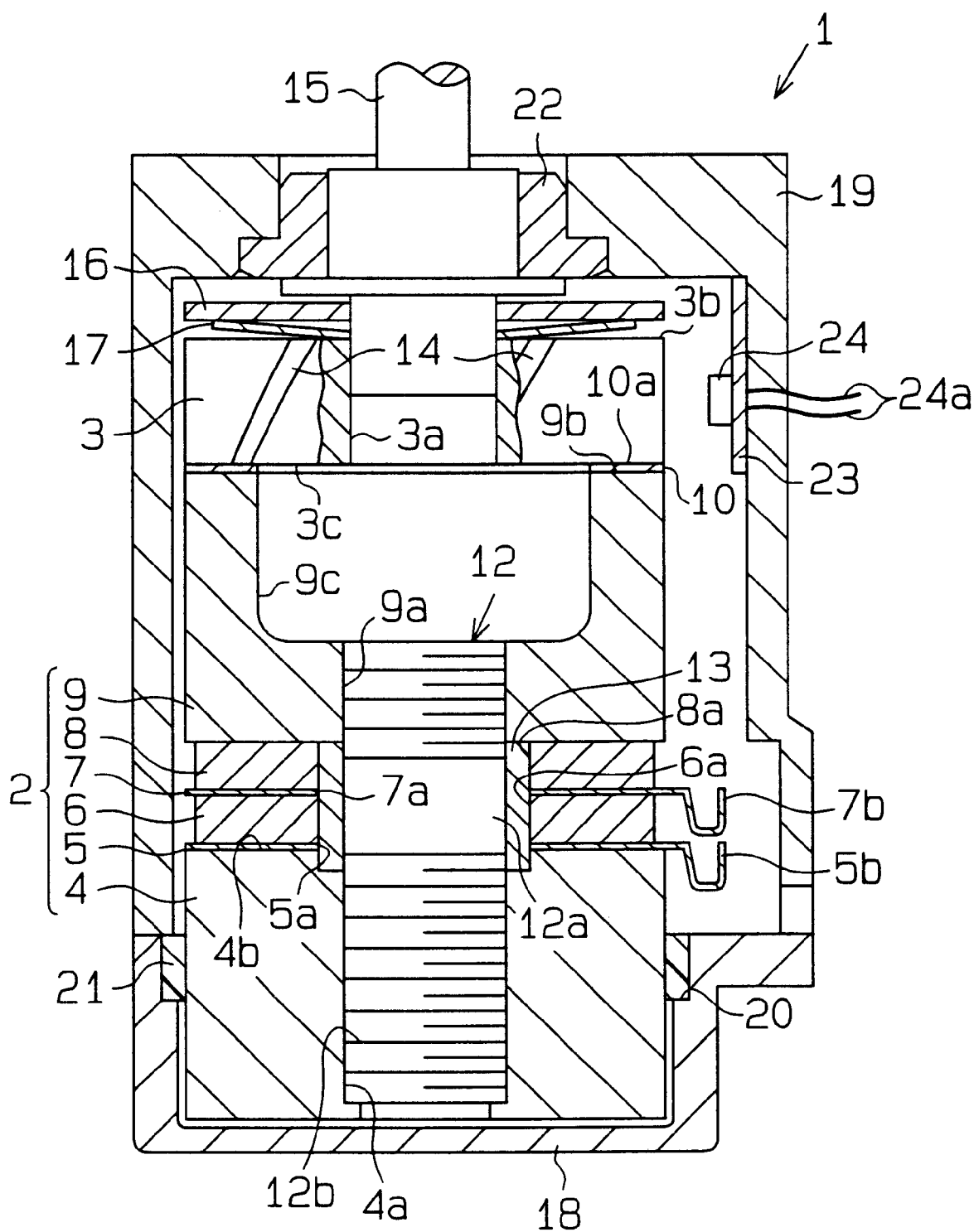
FIG. 1 is a longitudinal cross-sectional view of an ultrasonic motor according to a first embodiment of the present invention.

A first embodiment of the present invention will be described with reference to FIGS. 1 and 2.

A standing-wave type ultrasonic motor 1 according to the first embodiment includes a stator 2 and a rotor 3. The stator 2 includes a first block 4, a first electrode plate 5, a first piezoelectric element 6, a second electrode plate 7, a second piezoelectric element 8 and a second block 9 stacked in this order from bottom to top in FIG. 1.

Each one of the first and second blocks 4, 9 is cylindrical and has a threaded through hole 4a, 9a penetrating through its center in an axial direction of the ultrasonic motor 1. A plurality of slits 11 (FIG. 2) are arranged along an outer peripheral surface of the first block 4 at substantially equal angular intervals. Each slit 11 extends obliquely and downwardly from a top surface 4b of the first block 4 in a counterclockwise direction in FIG. 2. A cylindrical recess 9c is formed in a top surface 9b of the second block 9. A lining material 10 is placed on the annular top surface 9b of the second block 9. A top surface 10a of the lining material 10 engages a bottom surface 3c of the rotor 3.

Figure 2:
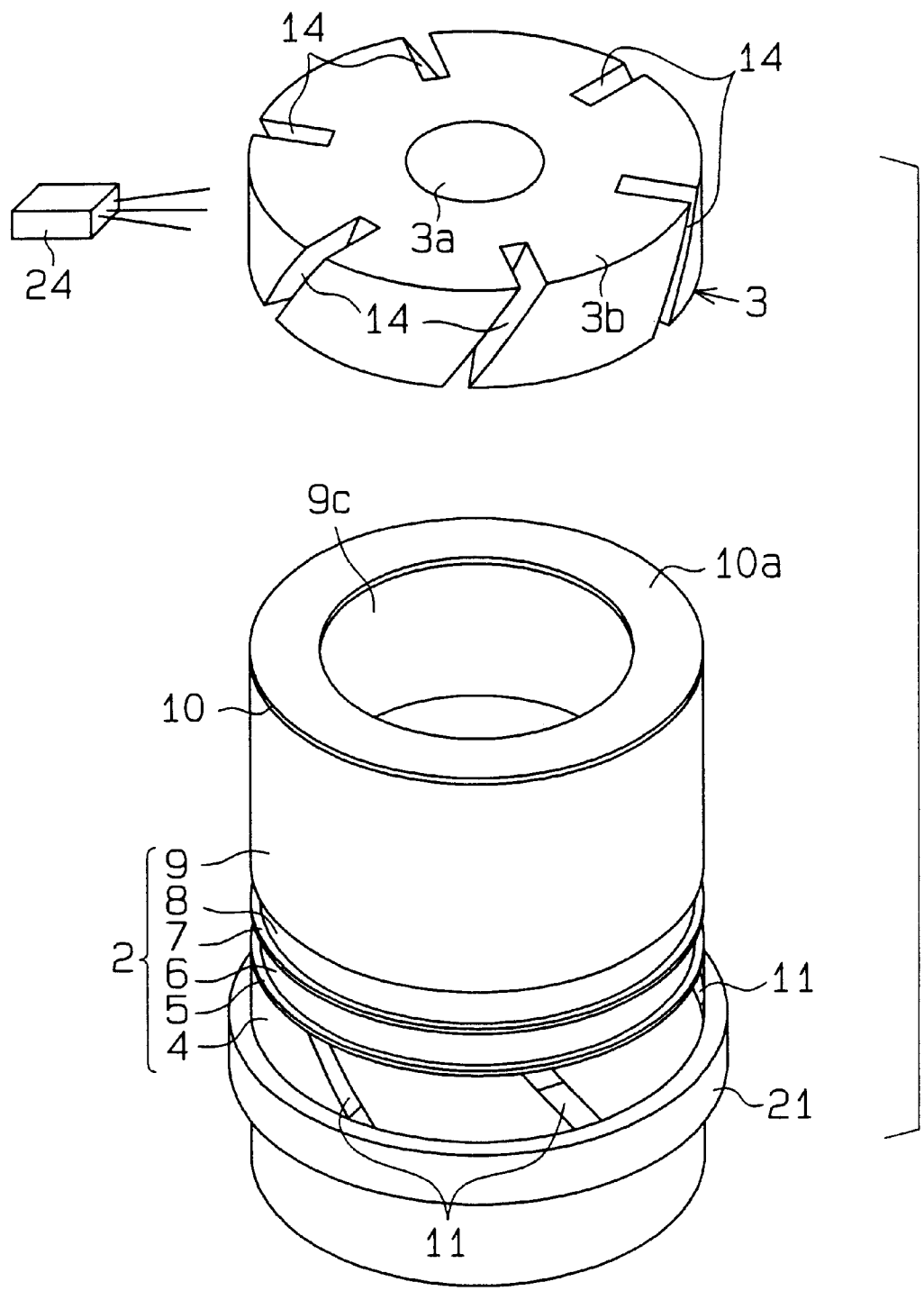
FIG. 2 is a perspective view showing a positional relationship between a rotor and a sensor of the ultrasonic motor according to the first embodiment.

With reference to FIG. 1, each one of the first electrode plate 5, the first piezoelectric element 6, the second electrode plate 7 and the second piezoelectric element 8 is disk shaped and has a through hole 5a–8a penetrating through its center in the axial direction of the ultrasonic motor 1. Each one of the first and second electrode plates 5, 7 has a terminal piece 5b, 7b formed in an outer peripheral surface thereof. These terminal pieces 5b, 7b are connected to a voltage supply device (not shown). A high frequency alternating voltage is applied between the terminal piece 5b and the terminal piece 7b from the voltage supply device.

A generally cylindrical connecting bolt 12 is threadably received within the threaded through hole 4a of the first block 4 and also within the threaded through hole 9a of the second block 9. More specifically, the bolt 12 includes a couple of threaded portions 12b and a center portion 12a. The center portion 12a is axially located between the threaded portions 12b and has no threads. One threaded portion 12b extends from one end of the bolt 12 to the center portion 12a and is securely, threadably received within the threaded through hole 4a of the first block 4. The other threaded portion 12b extends from the other end of the bolt 12 to the center portion 12a and is securely, threadably received within the threaded through hole 9a of the second block 9. The threaded portions 12b are threaded in opposite directions with respect to each other. A cylindrical dielectric collar 13 is received within the through holes 5a–8a of the first electrode plate 5, the first piezoelectric element 6, the second electrode plate 7 and the second piezoelectric element 8. The center portion 12a of the bolt 12 is received within the dielectric collar 13.

A through hole 3a axially penetrates through a center of the cylindrical rotor 3. A plurality of slits 14 are arranged along an outer peripheral surface of the rotor 3 at substantially equal angular intervals. Each slit 14 extends obliquely and downwardly from a top surface 3b of the rotor 3 in a clockwise direction in FIG. 2.

A shaft 15 is secured within the through hole 3a of the rotor 3 at one end side. A spring support plate 16 is secured around shaft 15. A Bellville spring 17 is held between the spring support plate 16 and the rotor 3, as shown in FIG. 1. The rotor 3 is urged downward by a resilient force of the Bellville spring 17, so that the bottom surface 3c of the rotor 3 is rotatably urged against the top surface 10a of the lining material 10. A key groove (not shown) is formed in each one of the rotor 3 and the shaft 15. Upon insertion of a corresponding key within the key groove of the rotor 3 and the key groove of the shaft 15, the rotor 3 and the shaft 15 are connected together, allowing integral rotation of the rotor 3 and the shaft 15.

The stator 2 and the rotor 3 are received within a metal housing that includes a lower housing 18 and an upper housing 19.

The lower housing 18 is cylindrically shaped and has a bottom portion at one end and an opening at the other end. An engaging recess 20 is formed along an inner peripheral surface of the open end of the lower housing 18. A dielectric flange 21 made of a resin material is secured to an outer peripheral surface of the first block 4 of the stator 2 and is securely fitted within the engaging recess 20, so that the stator 2 is secured to the lower housing 18.

The shaft 15 is rotatably supported by the upper housing 19 through a bearing 22.

A reflection type photosensor (photo interrupter) 24 acting as the sensor is mounted inside of the upper housing 19 through a support-member 23. The photosensor 24 is arranged to oppose each one of the slits 14 in a radial direction of the rotor 3 when the slit 14 comes in front of the photosensor 24 during the rotation of the rotor 3. The photosensor 24 has a light-emitting element and a light-sensing element. The photosensor 24 is connected to a control device (not shown) through a wiring 24a. The control device is connected to the power supply device. The control device calculates an amount of rotation of the rotor 3 relative to a reference position of the rotor 3 based on a signal transmitted from the photosensor 24 through the wiring 24a. Then, the control device computes a current rotational position and a current rotational speed of the rotor 3 based on the amount of rotation. Thereafter, the control device determines a high frequency alternating voltage to be applied between the terminal piece 5b and the terminal piece 7b based on a difference between the current rotational position of the rotor 3 and a target rotational position of the rotor 3 and also based on a difference between the current rotational speed of the rotor 3 and a target rotational speed of the rotor 3. Next, the control device sends a signal to the voltage supply device to apply the predetermined high frequency alternating voltage between the terminal piece 5b and the terminal piece 7b.

Operation of the ultrasonic motor 1 will be described.

When the predetermined high frequency alternating voltage is applied between the terminal piece 5b and the terminal piece 7b from the voltage supply device, longitudinal vibrations are generated in the first and second piezoelectric elements 6, 8. The longitudinal vibrations are conducted to the first block 4 and the rotor 3. Because of the slits 11, 14, each of which extends obliquely relative to a direction parallel to a rotational axis of the ultrasonic motor 1, the first block 4 and the rotor 3 generate torsional vibrations. The longitudinal vibrations provide a suspension force to the rotor 3, and the torsional vibrations provide a rotational force to the rotor 3, so that the rotor 3 is rotated.

In the above arrangement, when the light emitted from the light-emitting element of the photosensor 24 impinges upon the outer peripheral surface of the rotor 3, the light is reflected from the outer peripheral surface of the rotor 3 and is then sensed by the light-sensing element of the photosensor 24. Thus, the photosensor 24 outputs a signal indicative of a high light intensity "H". On the other hand, when one of the slits 14 is positioned to oppose the photosensor 24, the light emitted from the light-emitting element of the photosensor 24 penetrates into the slit 14 and is not reflected from the slit 14 to the light-sensing element of the photosensor 24. Thus, the photosensor 24 outputs a signal indicative of a low light intensity "L". These signals "H", "L" are transmitted to the control device through the wiring 24a.

The control device computes the amount of rotation of the rotor 3 relative to the reference position of the rotor 3 based on the signals transmitted from the photosensor 24 through the wiring 24a and determines the current rotational position and the current rotational speed of the rotor 3. Then, the control device determines a high frequency alternating voltage to be applied based on the difference between the current position of the rotor 3 and the target position of the rotor 3 and also based on the difference between the current rotational speed of the rotor 3 and the target rotational speed of the rotor 3. Thereafter, the control device generates a signal indicative of the predetermined high frequency alternating voltage to be applied and sends it to the voltage supply device. Then, the voltage supply device applies the predetermined high frequency alternating voltage specified by the signal between the terminal piece 5b and the terminal piece 7b. Thus, the rotational position and the rotational speed of the rotor 3 are controlled through the above-described feedback control.

The present embodiment provides the following advantages.

Figure 8:
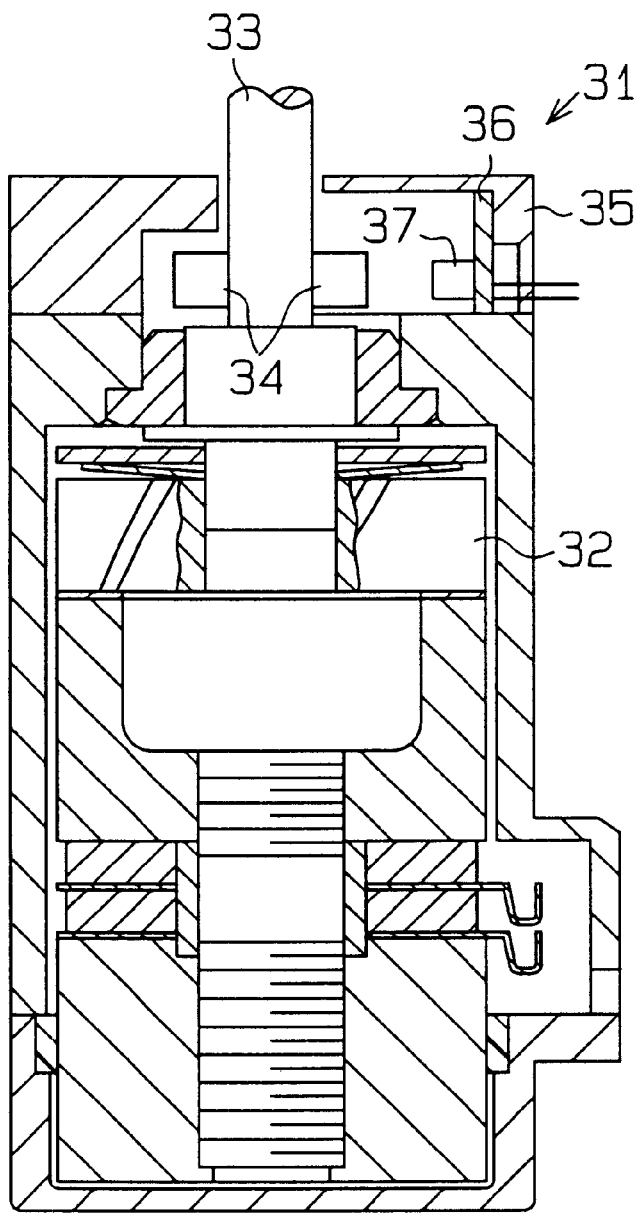
FIG. 8 is a longitudinal cross-sectional view of a previously proposed ultrasonic-motor.

(1) The photosensor 24 senses the position of each one of the slits 14 which comes in front of the photosensor 24 during the rotation of the rotor 3 to obtain the rotational position of the rotor 3. Thus, the rotational position of the rotor 3 can be obtained without providing a dedicated sensor target, such as the magnets 34 of the previously proposed ultrasonic motor 31 shown in FIG. 8. As a result, it is possible to reduce the number of the components.

(2) Each slit 14 extends obliquely, so that the longitudinal vibrations are more effectively converted into the torsional vibrations.

(3) The photosensor 24 is arranged radially outward of the rotor 3, so that a volume of the ultrasonic motor 1 is not increased in the axial direction of the ultrasonic motor 1.

(4) The photosensor 24 does not contact the rotor 3, so that the photosensor 24 has longer lifetime than a contact type sensor.

(5) The photosensor 24 is commercially available, so that the manufacturing cost of the ultrasonic motor can be reduced.

(6) Unlike magnetic field sensors, the photosensor 24 is not influenced by a magnetic field.

Second Embodiment

A second embodiment of the present invention will be described with reference to FIGS. 3A, 3B and 4. An ultrasonic motor according to the second embodiment differs from the ultrasonic motor according to the first embodiment in that the ultrasonic motor according to the second embodiment allows detection of a rotational direction of the rotor 3. Components similar to those of the first embodiment will be referred with similar numerals and will not be described further.

Figure 3A:
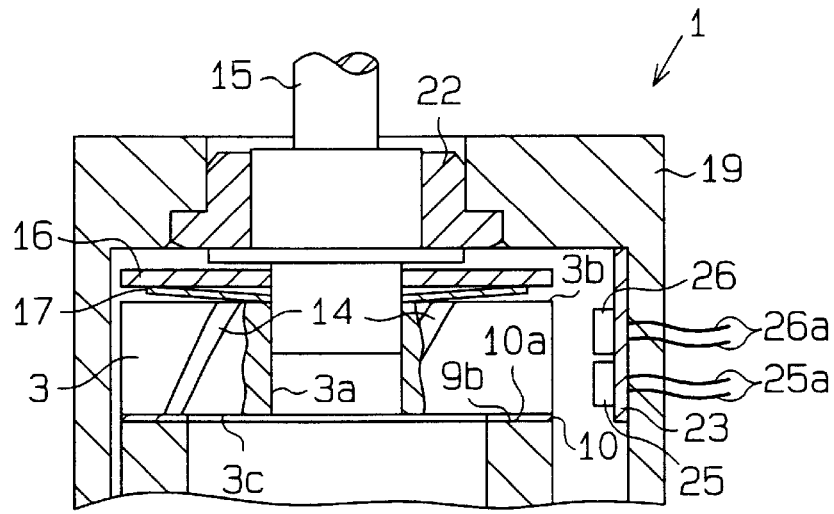
FIG. 3A is a partial longitudinal cross-sectional view of an ultrasonic motor according to a second embodiment of the present invention.
Figure 3B:
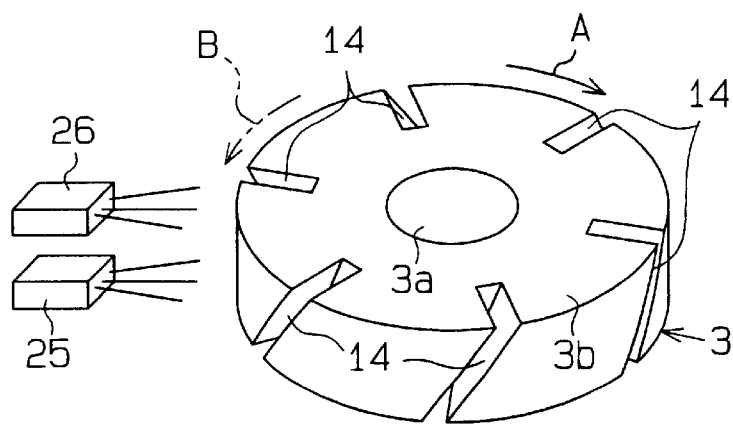
FIG. 3B is a schematic perspective view showing a positional relationship between a rotor and sensors of the ultrasonic motor according to the second embodiment.

With reference to FIG. 3A, first and second photosensors 25, 26 are mounted inside of the upper housing 19 through the support member 23. The photosensors 25, 26 are arranged to oppose each one of the slits 14 in the radial direction of the rotor 3 when the slit 14 comes in front of each photosensor 25, 26 during the rotation of the rotor 3. Furthermore, the photosensors 25, 26 are aligned along a direction parallel to the rotational axis of the ultrasonic motor 1. The first photosensor 25 is placed below the second photosensor 26. The first and second photosensors 25, 26 are connected to the control device (not shown) through wirings 25a, 26a, respectively.

The control device determines a rotational direction of the rotor 3 and an amount of rotation of the rotor 3 relative to the reference position of the rotor 3 based on a first pulse signal P1 transmitted from the first sensor 25 and a second pulse signal P2 transmitted from the second photosensor 26. Then, the control device determines the current rotational position and the current rotational speed of the rotor 3 based on the amount of rotation of the rotor 3 relative to the reference position of the rotor 3. Thereafter, the control device determines a high frequency alternating voltage to be applied based on a difference between the current rotational position of the rotor 3 and the target rotational position of the rotor 3, difference between the current rotational direction of the rotor 3 and a target rotational direction of the rotor 3 and a difference between the current rotational speed of the rotor 3 and the target rotational speed of the rotor 3. Thereafter, the control device generates a signal indicative of the predetermined high frequency alternating voltage to be applied and sends it to the voltage supply device.

Figure 4:
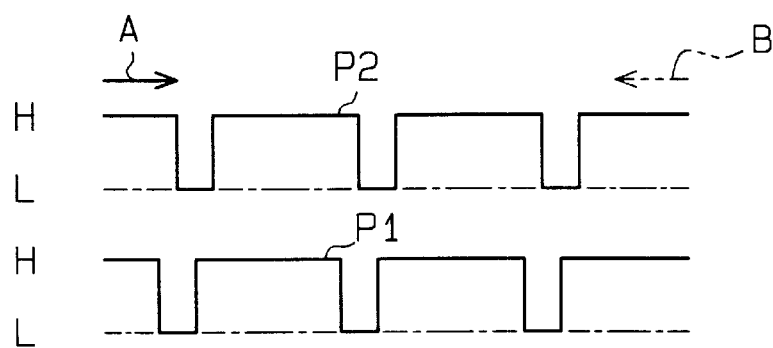
FIG. 4 is a graph showing pulse signals outputted from the sensors of the ultrasonic motor according to the second embodiment.

With reference to FIG. 4, each pulse signal P1, P2 becomes a high level ("H" level) when the corresponding photosensor 25, 26 is out of alignment with any of the slits 14, i.e., when the photosensor 25, 26 senses the high light intensity. On the other hand, each pulse signal P1, P2 becomes a low level ("L" level) when the corresponding photosensor 25, 26 is in alignment with any of the slits 14, i.e., when the photosensor 25, 26 senses the low light intensity.

For example, when the rotor 3 rotates in the clockwise direction (rotating in a direction of arrow A in FIG. 3B), the first photosensor 25 comes into alignment with one of the slits 14 earlier than the second photosensor 26 due to the fact each slit 14 extends obliquely and downwardly in the clockwise direction. Thus, as shown in FIG. 4 in which pulse signals P1, P2 change with time from the left side to the right side during the rotation of the rotor 3 in the clockwise direction, the first pulse P1 changes from "H" to "L" before the second pulse P2 changes from "H" to "L". Thereafter, when the rotor 3 further rotates, the first photosensor 25 opposes the outer peripheral surface of the rotor 3, so that the first pulse signal P1 changes from "L" to "H". Then, the second photosensor 26 opposes the outer peripheral surface of the rotor 3, so that the second pulse signal P2 changes from "L" to "H".

On the other hand, when the rotor 3 rotates in the counterclockwise direction (rotating in a direction of arrow B in FIG. 3B), the second photosensor 26 comes into alignment with one of the slits 14 earlier than the first photosensor 25. Thus, the second pulse P2 changes from "H" to "L" before the first pulse P1 changes from "H" to "L". During this rotation of the rotor 3 in the counterclockwise direction, the pulse signals P1, P2 change with time from the right side to the left side in FIG. 4.

As a result, when the first pulse signal P1 changes from "H" to "L" before the second pulse signal P2 changes from "H" to "L", the control device determines that the rotational direction of the rotor 3 is the clockwise direction. On the other hand, when the second pulse signal P2 changes from "H" to "L" before the first pulse signal P1 changes from "H" to "L", the control device determines that the rotational direction of the rotor 3 is the counterclockwise direction.

The control device determines the amount of rotation of the rotor 3 relative to the reference position of the rotor 3 based on the determined rotational direction of the rotor 3 and the number of input signal pulses and computes the current rotational position and the rotational speed of the rotor 3. Then, the control device controls the rotational direction in addition to the rotational position and the rotational speed of the rotor 3 through the feedback control.

In the second embodiment, besides the advantages described in the sections (1) to (6) of the first embodiment, the following advantages are achieved.

(7) Due to the fact that each slit 14 extends obliquely relative to the direction parallel to the rotational axis of the ultrasonic motor 1, the alignment of the first and second photosensors 25, 26 along the direction parallel to the rotational axis of the ultrasonic motor 1 causes the phase difference between the first pulse signal P1 and the second pulse signal P2, allowing the detection of the rotational direction of the rotor 3 based on the phase difference. As a result, the rotational direction of the rotor 3 can be detected with the simple arrangement of the photosensors 25, 26.

(8) With use of the two photosensors 25, 26 that output the pulse signals P1, P2 having a phase difference therebetween, the rotational position and the rotational speed of the rotor 3 can be detected with a higher resolution and higher accuracy in comparison to the ultrasonic motor having only one photosensor, allowing more accurate control of the rotor 3.

(9) The second embodiment allows the detection of the rotational direction of the rotor 3. Thus, the rotor 3 can be more accurately controlled in both the forward and backward rotations of the rotor 3.

The above-described embodiments are not limited to the arrangements described above and can be modified as follows.

Figure 5:
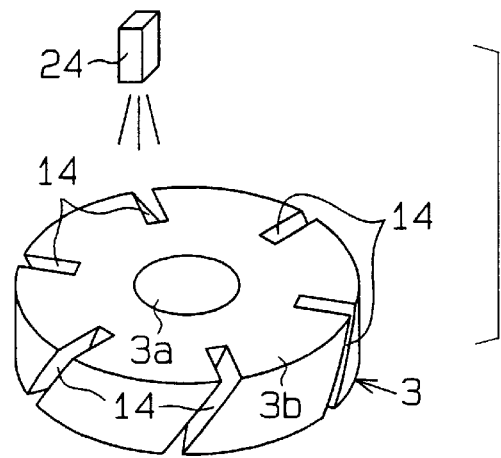
FIG. 5 is a schematic perspective view showing a modification of the first embodiment.

In the first embodiment, the photosensor 24 is arranged to oppose each one of the slits 14 in the radial direction of the rotor 3 when the slit 14 comes in front of the photosensor 24 during the rotation of the rotor 3. Alternatively, as shown in FIG. 5, the photosensor 24 can be arranged above the rotor 3 to oppose each one of the slits 14 in the axial direction when the slit 14 comes in front of the photosensor 24 during the rotation of the rotor 3. In this case, the photosensor 24 is mounted within the upper housing 19 through a support member. Furthermore, each one of the spring support plate 16 and the Bellville spring 17 has through holes that axially penetrate therethrough and are axially aligned with the slits 14, respectively. Thus, the light emitted from the photosensor 24 is not shaded by the spring support plate 16 and the Bellville spring 17 and can reach each one of the slits 14 when the slit 14 comes in front of the photosensor 24. In this way, the photosensor 24 can be provided in the ultrasonic motor 1 without increasing the volume of the ultrasonic motor 1 in the radial direction thereof.

Figure 6:
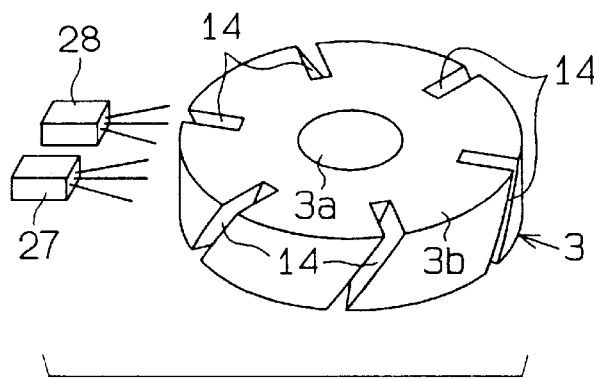
FIG. 6 is a schematic perspective view showing a modification of the second embodiment.

To achieve the advantages similar to those described in the second embodiment, the two photosensors 25, 26 need not be aligned along the direction parallel to the rotational axis of the ultrasonic motor 1. More specifically, the two photosensors 25, 26 can be arranged in any positions as long as the two photosensors 25, 26 are arranged adjacent to each other along any direction that is nonparallel to any of the slits 14. For example, as shown in FIG. 6, two photosensors 27, 28 similar to the photosensors 25, 26 can be arranged adjacent to each other along a circumferential direction of the rotor 3.

Figure 7:
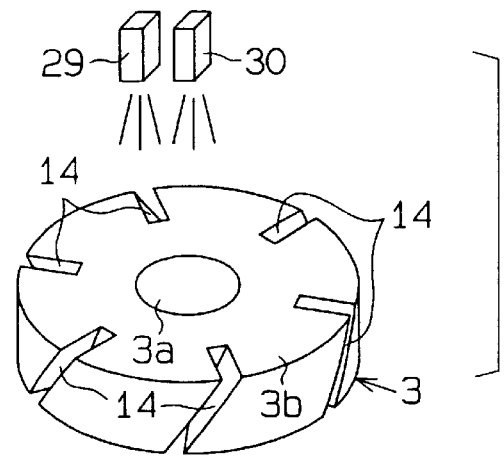
FIG. 7 is a schematic perspective view showing another modification of the second embodiment.

To achieve the advantages similar to those described in the second embodiment, the two photosensors 25, 26 need not be arranged to oppose each one of the slits 14 in the radial direction of the rotor 3 when the slit 14 comes in front of each photosensor 25, 26 during the rotation of the rotor 3. More specifically, as shown in FIG. 7, two photosensors 29, 30 similar to the photosensors 25, 26 can be arranged above the rotor 3 in such a manner that the photosensors 29, 30 are arranged adjacent to each other along a direction that is nonparallel to any of the slits 14 and oppose each one of the slits 14 in the axial direction of the ultrasonic motor 1 when the slit 14 comes in front of each photosensor 29, 30 during the rotation of the rotor 3. In this way, the two photosensor 29, 30 can be provided in the ultrasonic motor 1 without increasing the volume of the ultrasonic motor 1 in the radial direction of the ultrasonic motor 1.

Apart from the embodiment shown in FIG. 4, the two photosensors 25, 26 can be arranged in such a manner that the time period during which "L" of the pulse signal P1 is generated in the one photosensor 25 does not overlap the time period during which "L" of the pulse signal P2 is generated in the other photosensor 26.

Furthermore, inner surfaces of each slit 14 can be painted black or can be made as diffusive surfaces or scattering surfaces. With this arrangement, the light emitted from the light-emitting element of the photosensor 24 is absorbed by the black inner surfaces of each slit 14 or is diffused by the diffusive inner surfaces of each slit 14. In this way, the light-sensing element of the photosensor 24 does not sense the light reflected from the slit 14.

The sensor is not limited to the photosensor. For instance, a reluctance sensor or a capacitive sensor can be used in place of the photosensor. In this way, the rotational position of the rotor 3 can be detected with the sensor that does not contact the rotor 3.

Also, a contact type sensor can be used in place of the photosensor. For example, a sensor having a brush can be provided, and the rotor 3 is made to be electrically conductive. The brush is mounted inside of the upper housing 19. The brush is arranged to oppose each one of the slits 14 in the radial direction of the rotor 3 when the slit 14 comes in front of the brush during the rotation of the rotor 3. A size and a shape of the brush are selected such that when the brush is out of alignment with any of the slits 14, the brush contacts and is bent by the outer peripheral surface of the rotor 3. In addition to this, the size and the shape of the brush are,also selected such that when the brush is in alignment with any of the slits 14, the brush is received within the slit 14 and does not contact the rotor 3. With this arrangement, an "on" signal is outputted from the sensor when the brush contacts the outer peripheral surface of the rotor 3 during the rotation of the rotor 3, and an "off" signal is outputted from the sensor when the brush is in alignment with any of the slits 14. Based on these signals, the rotational position and the rotational speed of the rotor 3 are detected.

A plurality of sensors (more than two) can be provided. In this case, an angular distance between each two circumferentially adjacent sensors should be different from an angular distance between each two circumferentially adjacent slits. In this way, the resolution in the position detection of the rotor 3 can be further improved.

In the second embodiment, only one pair of the photosensors 25, 26 are provided. However, a plurality of pairs of photosensors 25, 26 can be provided. In this case, an angular distance between each two circumferentially adjacent pairs of photosensors 25, 26 should be different from an angular distance between each two circumferentially adjacent slits. In this way, the resolution in the position detection of the rotor 3 can be further improved.

A plurality of sensors can be arranged to oppose each one of the slits 14 in the radial direction of the rotor 3 when the slit 14 comes in front of each sensor during the rotation of the rotor 3. In addition to these sensors, another plurality of sensors can be arranged to oppose each one of the slits 14 in the axial direction of the rotor 3 when the slit 14 comes in front of each sensor during the rotation of the rotor 3.

Also, the pair of photosensors 25, 26 can be arranged to oppose each one of the slits 14 in the radial direction of the rotor 3 when the slit 14 comes in front of each photosensor 25, 26 during the rotation of the rotor 3. In addition to the pair of photosensors 25, 26, another pair of photosensors 25, 26 can be arranged to oppose each one of the slits 14 in the axial direction of the rotor 3 when the slit 14 comes in front of each photosensor 25, 26 during the rotation of the rotor 3.

The ultrasonic motor 1 does not necessarily have both the upper and lower housings 18, 19. In this case, for example, as disclosed in Japanese Unexamined Patent Publication No.

11-46485, which is hereby incorporated by reference, the rotor 3 may be rotatably urged against the stator 2 with use of a bolt and a nut. The sensor may be mounted to the second block 9 via a support piece in such a manner that a position of the sensor does not change.

The number of the slits 14 can be one or more. In a case of providing more than one slits 14, the slits 14 are arranged at substantially equal angular intervals. Furthermore, by increasing the number of the slits 14, the resolution in the position detection of the rotor 3 can be improved.

The slits 11 of the first block 4 can be eliminated, if desired. Even in this arrangement, the torsional vibrations can be generated by the slits 14 formed in the rotor 3 to rotate the rotor 3.

Each housing 18, 19 is not necessarily made of the metal material. For instance, each housing 18, 19 can be made of a resin material.

Additional advantages and modifications will readily occur to those skilled in the art. The invention in its broader terms is therefore, not limited to the specific details, representative apparatus, and illustrative examples shown and described.

What is claimed is:

1. An ultrasonic motor comprising:

a stator having a plurality of piezoelectric elements clamped between a plurality of blocks, said stator vibrating upon application of a voltage to said plurality of piezoelectric elements;

a rotor rotatably urged against said stator, said rotor having a plurality of slits formed in a peripheral surface of said rotor and being rotated by said stator;

a plurality of sensors for sensing a position of at least one of said plurality of slits; and an angular distance between each two circumferential adjacent said sensors is different from an angular distance between each two circumferentially adjacent said slits.

2. The ultrasonic motor of claim 1, wherein each of said plurality of slits extends relative to a direction parallel to a rotational axis of said ultrasonic motor.

3. The ultrasonic motor of claim 1, wherein said plurality of sensors are further for detecting an amount of light reflected from said rotor in order to determine a rotational direction and rotational speed of said rotor.

4. The ultrasonic motor of claim 1, wherein each of said plurality of sensors comprises one of a photosensor, reluctance sensor, capacitive sensor and contact-type sensor.

5. An ultrasonic motor comprising:

a stator having a plurality of piezoelectric elements clamped between a plurality of blocks, said stator vibrating upon application of a voltage to said plurality of piezoelectric elements;

a rotor rotatably urged against said stator, said rotor having a plurality of slits formed in a peripheral surface of said rotor and being rotated by said stator; and a plurality of sensors for sensing a position of at least one of said plurality of slits, wherein said plurality of sensors are arranged adjacent to one another along a direction that is nonparallel to any of said plurality of slits.

6. The ultrasonic motor of claim 5, wherein each of said plurality of slits extends obliquely relative to a direction parallel to a rotational axis of said ultrasonic motor.

7. The ultrasonic motor of claim 5, wherein said plurality of sensors are further for detecting an amount of light reflected from said rotor in order to determine a rotational direction and a rotational speed of said rotor.

8. The ultrasonic motor of claim 5, wherein each of said plurality of sensors comprises one of a photosensor, reluctance sensor, capacitive sensor and contact-type sensor.

9. An ultrasonic motor comprising:

a stator having a plurality of piezoelectric elements clamped between a plurality of blocks, said stator vibrating upon application of a voltage to said plurality of piezoelectric elements;

a rotor rotatably urged against said stator, said rotor having one or more slits formed in a peripheral surface of said rotor and being rotated by said stator; and a plurality of sensors for sensing a position of at least one of said one or more slits, wherein:

said plurality of sensors are arranged along a direction that is parallel to a rotational axis of said ultrasonic motor; and each one of said plurality of sensors is arranged to oppose each one of said one or more slits in a radial direction of said rotor when said each one of said one or more slits comes in front of said each one of said plurality of sensors during rotation of said rotor.

10. The ultrasonic motor of claim 9, wherein each of said one or more slits extends obliquely relative to a direction parallel to a rotational axis of said ultrasonic motor.

11. The ultrasonic motor of claim 9, wherein said plurality of sensors are further for detecting an amount of light reflected from said rotor in order to determine a rotational direction and rotational speed of said rotor.

12. The ultrasonic motor of claim 9, wherein each of said plurality of sensors comprises one of a photosensor, reluctance sensor, capacitive sensor and contact-type sensor.

* * * * *